US012079045B2

(12) United States Patent
Bitz et al.

(10) Patent No.: US 12,079,045 B2
(45) Date of Patent: Sep. 3, 2024

(54) FABRIC HINGED DEVICE

(71) Applicant: Microsoft Technology Licensing, LLC, Redmond, WA (US)

(72) Inventors: Brian D. Bitz, Woodinville, WA (US); Whitney Anne Reed, Seattle, WA (US); Bernard T. Selting, Seattle, WA (US); Michael Gordon Oldani, Redmond, WA (US); Le Chang, Kirkland, WA (US); Joseph B. Gault, West Linn, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/566,367

(22) Filed: Dec. 30, 2021

(65) Prior Publication Data

US 2023/0088731 A1 Mar. 23, 2023

Related U.S. Application Data

(60) Provisional application No. 63/246,373, filed on Sep. 21, 2021.

(51) Int. Cl.
*G06F 1/16* (2006.01)
*E05D 1/00* (2006.01)
*E05D 11/00* (2006.01)

(52) U.S. Cl.
CPC .............. *G06F 1/1681* (2013.01); *E05D 1/00* (2013.01); *E05D 11/0081* (2013.01); *E05Y 2999/00* (2024.05)

(58) Field of Classification Search
CPC ...................................................... G06F 1/1681
See application file for complete search history.

(56) References Cited

U.S. PATENT DOCUMENTS

| | | | |
|---|---|---|---|
| 8,826,495 B2 | 9/2014 | Jauvtis et al. | |
| 9,639,121 B2 | 5/2017 | Min et al. | |
| 9,840,861 B1* | 12/2017 | Määttä | E05D 11/105 |
| 9,883,583 B2 | 1/2018 | Cousins et al. | |
| 9,971,379 B2* | 5/2018 | Griffin, II | G06F 1/1607 |
| 10,036,187 B2 | 7/2018 | Cheah et al. | |
| 10,104,787 B2 | 10/2018 | Rothkopf et al. | |
| 10,635,141 B2* | 4/2020 | Silvanto | E05D 11/0081 |
| 10,683,591 B1* | 6/2020 | Podhajny | A45C 11/00 |
| 11,009,921 B1* | 5/2021 | Bharadwaj | G09F 9/301 |
| 11,029,735 B2* | 6/2021 | Silvanto | E05D 11/0081 |
| 11,061,444 B2* | 7/2021 | Nakamura | G06F 1/162 |

(Continued)

OTHER PUBLICATIONS

"International Search Report and Written Opinion Issued in PCT Application No. PCT/US22/037957", Mailed Date: Nov. 17, 2022, 14 Pages.

(Continued)

*Primary Examiner* — Anthony M Haughton
*Assistant Examiner* — Theron S Milliser
(74) *Attorney, Agent, or Firm* — Rainier Patents, P.S.

(57) ABSTRACT

This patent relates to hinged devices, such as computing devices. One example includes a first portion and a second portion. A dynamic fulcrum hinge includes a flexible material extending between the first portion and the second portion and configured to begin rotation proximate to the first portion and finish rotation proximate to the second portion when the first portion is rotated toward the second portion.

20 Claims, 10 Drawing Sheets

(56) References Cited

U.S. PATENT DOCUMENTS

| | | | |
|---|---|---|---|
| 11,301,007 B2* | 4/2022 | Kinoshita | G06F 1/1618 |
| 11,307,612 B2* | 4/2022 | Hosokai | G06F 1/1652 |
| 11,409,331 B2* | 8/2022 | Hosokai | G06F 1/1656 |
| 11,449,108 B2* | 9/2022 | Li | H04M 1/0216 |
| 11,455,004 B2* | 9/2022 | Kinoshita | G06F 1/1681 |
| 2008/0125195 A1 | 5/2008 | Maenpaa | |
| 2016/0147267 A1 | 5/2016 | Bitz et al. | |
| 2017/0060180 A1* | 3/2017 | Griffin, II | G06F 1/1669 |
| 2017/0145724 A1 | 5/2017 | Siddiqui | |
| 2017/0356227 A1* | 12/2017 | Määttä | E05D 11/1007 |
| 2018/0113493 A1* | 4/2018 | Silvanto | E05D 11/0054 |
| 2020/0241604 A1* | 7/2020 | Nakamura | G06F 1/1618 |
| 2020/0264658 A1 | 8/2020 | Seo et al. | |
| 2020/0272207 A1* | 8/2020 | Silvanto | E05D 11/0054 |
| 2021/0018961 A1 | 1/2021 | Han et al. | |
| 2021/0278882 A1* | 9/2021 | Li | H04M 1/0216 |
| 2021/0294391 A1* | 9/2021 | Silvanto | G06F 1/1683 |
| 2021/0365066 A1* | 11/2021 | Kinoshita | G06F 1/1679 |
| 2021/0365072 A1* | 11/2021 | Kinoshita | G06F 1/1616 |
| 2022/0026958 A1* | 1/2022 | Hosokai | G06F 1/1616 |
| 2022/0083098 A1* | 3/2022 | Hosokai | G06F 1/1616 |

OTHER PUBLICATIONS

Hachman, Mark, "Hands on: Microsoft's Surface Book is a stunner as both a Tablet and a Laptop", Retrieved from: https://www.reseller.co.nz/article/586136/hands-microsoft-surface-book-stunner-both-tablet-laptop/, Oct. 6, 2015, 10 Pages.

Spence, Ewan, "New Apple Documents Expose Folding iPhone Hinge", Retrieved from: https://www.forbes.com/sites/ewanspence/2020/06/15/apple-iphone-folding-ios-new-leak-rumor-design-research-prototype/?sh=2e20780f5fd5, Jun. 16, 2020, 4 Pages.

* cited by examiner

FABRIC HINGED DEVICE

PRIORITY

This Patent Application is a Utility Non-Provisional that claims priority to U.S. Provisional Application 63/246,373, filed on Sep. 21, 2021, which is incorporated by reference herein in its entirety.

BACKGROUND

Many computer form-factors such as smart phones, tablets, and notebook computers can provide enhanced functionality by folding for storage and opening for use and/or by folding into various configurations. For instance, the folded device is easier to carry and the opened device offers more input/output area. Many hinged designs have been tried. However, hinges that are durable while occupying minimal device real estate have been difficult to achieve. The present concepts relate to these and other aspects.

SUMMARY

The description relates to hinged computing devices. One example can include a device that can include a first portion and a second portion that are rotatably secured by a tensioned flexible hinge. In one example the first portion can include a first hinge end and a first distal end. The second portion can include a second hinge end and a second distal end. A tension bar can be positioned in the second portion and can extend along the second hinge end and be biased away from the second hinge end by a tensioning mechanism. A flexible material can be secured to the first portion and to the tension bar in the second portion to function as a hinge between the first hinge end and the second hinge end. The hinge can operate through a range of rotation of the first and second ends from a closed orientation to a fully opened orientation. A bumper assembly can be secured between the first portion and the tension bar and interposed through a recess in the flexible material. A conductor can extend between and electrically couple the first and second portions. In the closed orientation, the tension bar can be configured to be translated toward the second hinge end by the flexible material overcoming the bias to collectively define a bend radius surface with the bumper assembly that the conductor bends around.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Note that some figures illustrate many elements and adding lead lines to all of the elements can diminish readability of the figure. Accordingly, not every element is designated in every figure.

DESCRIPTION

The present concepts relate to devices, such as computing devices employing tensioned flexible hinges that allow first and second portions to be rotated through a range of rotation, such as 0 degrees to 180 degrees. The present tensioned flexible hinges can be thinner and/or employ fewer components than traditional hardware hinges. The tensioned flexible hinges can also provide a safe pathway through the hinge for conductors that connect electrical components on the first and second device portions. The safe pathway can provide a surface (e.g., bend radius surface) that at least in part defines a minimum bend radius of the conductor along the pathway through the tensioned flexible hinges. These and other aspects are described below.

Figure 1A:
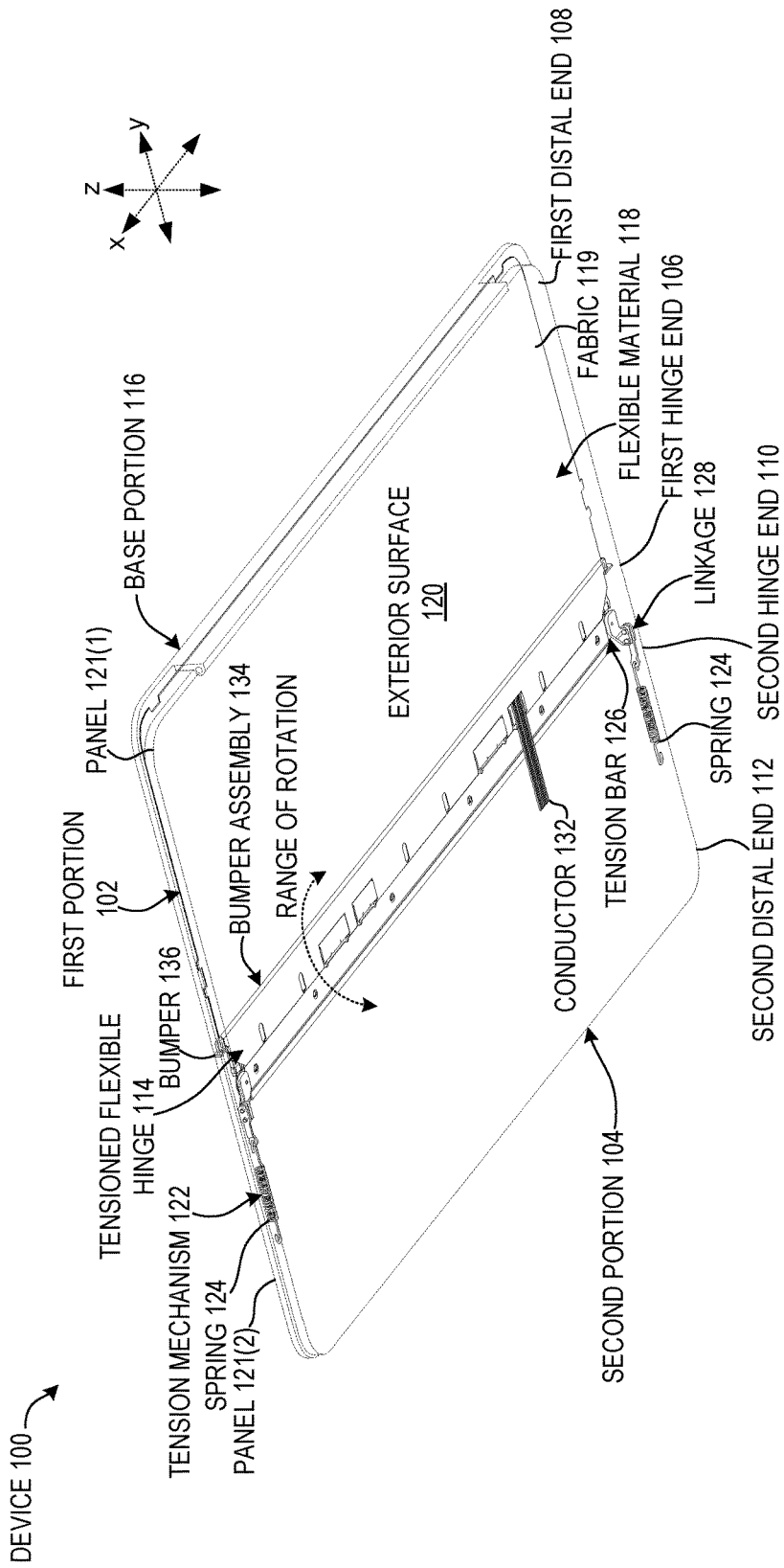
FIGS. 1A, 3A, and 4A show perspective views of example devices in accordance with some implementations of the present concepts.
Figure 1B:
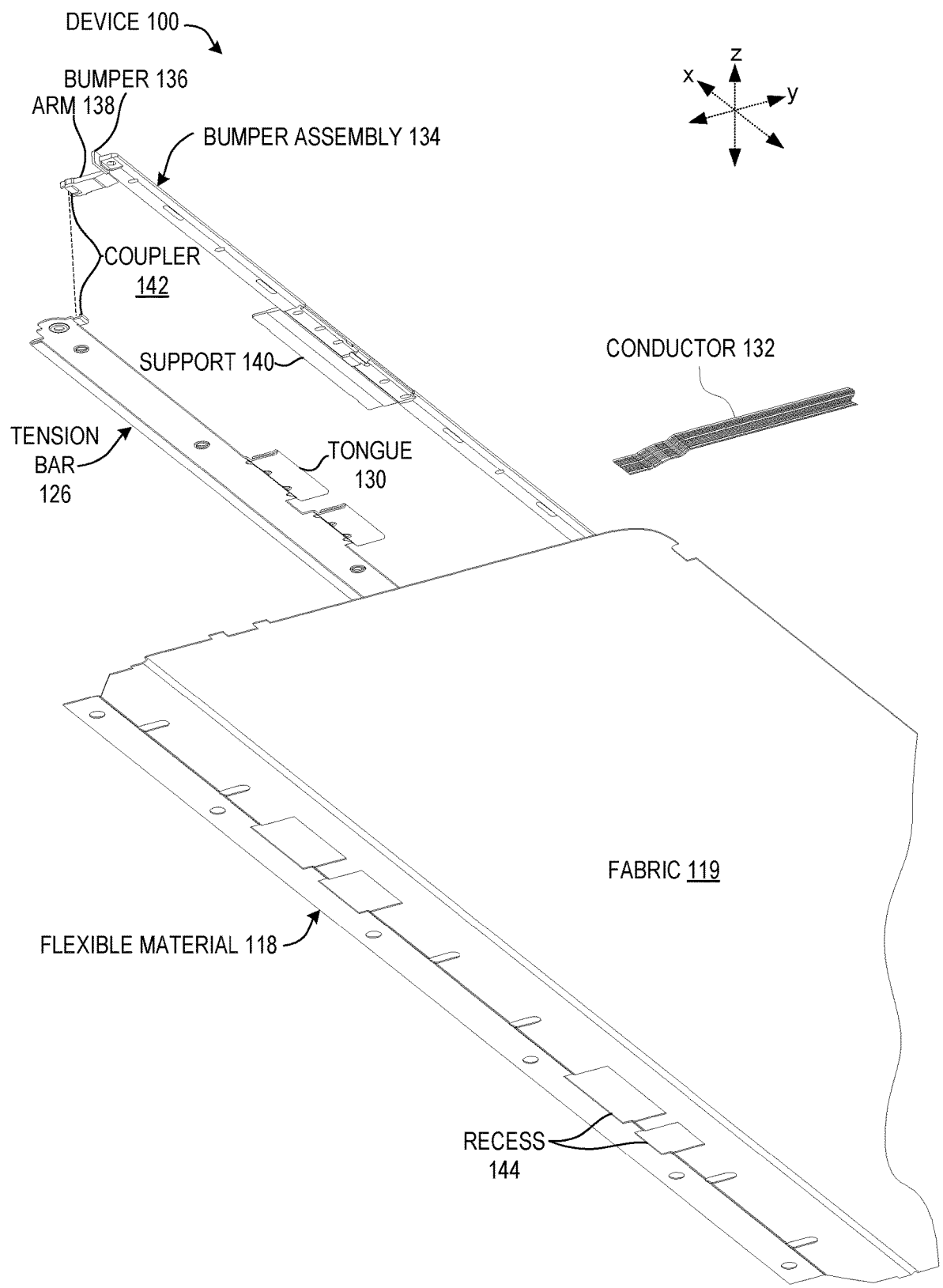
FIGS. 1B and 1C show exploded perspective views of example devices in accordance with some implementations of the present concepts.
Figure 1C:
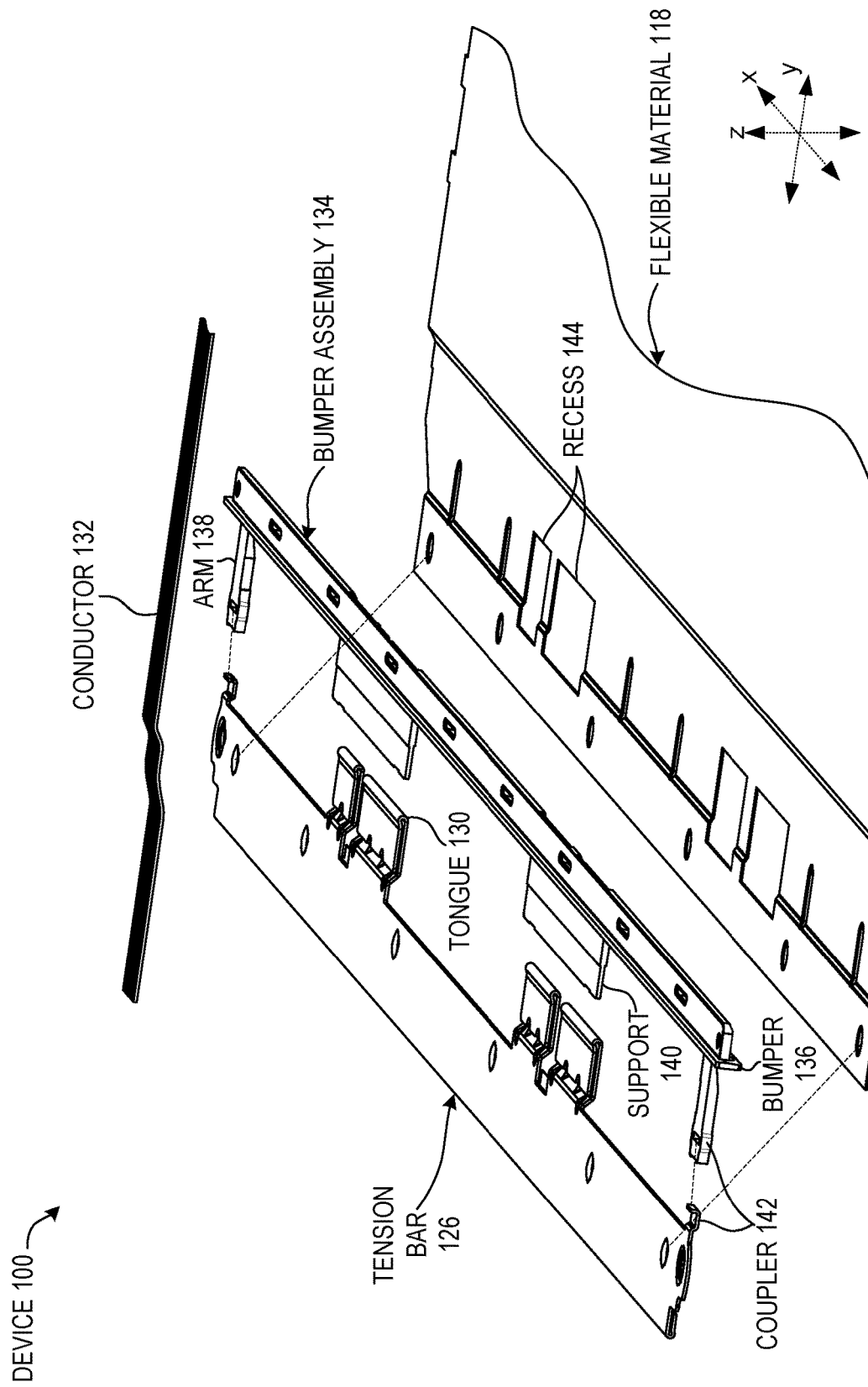

Introductory FIGS. 1A-1C collectively show an example device 100 that includes first and second portions 102 and 104 that can rotate relative to one another through a range of rotation, such as from a closed orientation to a fully opened orientation. The first portion 102 can include a first hinge end 106 and a first distal end 108. Similarly, the second portion 104 can include a second hinge end 110 and a second distal end 112. A tensioned flexible hinge 114 can rotationally secure the first hinge end 106 and the second hinge end 110. In the illustrated case, the first and second portions 102 and 104 are positioned relative to a base portion 116. For instance, the first portion 102 can be a kickstand that rotates relative to and can support the second portion 104 and/or the base portion 116. This is one example configuration, and other implementations may not include other portions. For instance, other implementations may be manifest as foldable smartphones, foldable tablet style devices, and/or notebook computers where the tensioned flexible hinge 114 rotatably secures two device portions.

The first and second portions 102 and 104 can be secured to a flexible material 118, such as fabric 119 or a polymer sheet. The flexible material 118 can be secured to the first portion 102 at the first hinge end 106. For instance, the flexible material 118 may be secured over an entire exterior surface 120 of the first portion 102, such as with adhesive so that the flexible material 118 is visible on the outside of the device 100 to a user. In other cases, the flexible material 118 may be covered with other components, such as a panel 121.

The flexible material 118 can be secured to the second portion 104 in a manner that creates a bias on the flexible material 118 toward the second distal end 112. In some configurations, the bias can be created by a tension mechanism 122. In this case, the tension mechanism 122 is manifest as a pair of springs 124 positioned along the edges of the second portion 104 extending from the second distal end 112 and toward the second hinge end 110. At the second hinge end 110, the springs 124 can be connected to a tension bar 126 directly or with a linkage 128. The springs 124 can be stretched and can bias the tension bar 126 toward the second distal end 112. The tension bar 126 can be secured to the flexible material 118 and transfer the bias to the flexible material to produce the tensioned flexible hinge 114 across the first hinge end 106 and the second hinge end 110.

The tension bar 126 can also include tongues 130 (FIG. 1B) that help support conductors 132 during rotation and avoid damage to the conductors 132 by partially defining a bend radius surface (designated in FIG. 3B) for the conductors 132. This configuration provides a technical solution offering a thinner hinge (in the z reference direction) than can be obtained with traditional hardware solutions, while defining a minimum bend radius that prevents damage to the conductors passing through the hinge despite the thinness of the hinge. This aspect is discussed in more detail below beginning relative to the discussion of FIGS. 2A and 2B.

A bumper assembly 134 can assist the tensioned flexible hinge 114. The bumper assembly 134 can be secured to the first portion 102. The bumper assembly 134 can include a bumper 136, arms 138 (FIG. 1B), and/or supports 140 (FIG. 1B). The bumper 136 can be positioned between the first and second hinge ends 106 and 110 and prevent them from contacting one another and potentially damaging one another during rotation. The bumper 136 can function to provide a technical solution that can buffer/protect the first and second portions 102 and 104 by providing kinematic control and protection and/or eliminating panel to panel (e.g., metal to metal) contact between the first and second portions. Further, the bumper assembly 134 can be secured to the tension bar 126, which is biased by the tension mechanism 122. Kinematic forces experienced by the bumper 136 can be dispersed and dissipated via the biasing forces provided by the tension mechanism 122. The tension bar 126 provides a technical solution of distributing biasing force from the tension mechanism 122 to the fabric 119 along the hinge axes as well as contributing to the minimum bend radius to protect the conductor 132.

The arms 138 can extend toward, and be coupled to, the tension bar 126 via couplers 142 (FIG. 1B). The arms 138 can contribute to hinge stability. The arms 138 can also be configured to affect rotational characteristics of the tensioned flexible hinge 114. For instance, the arms 138 can contribute to the tensioned flexible hinge 114 operating as a dynamic fulcrum hinge. This aspect is discussed in more detail below starting relating to FIGS. 2A and 2B.

The supports 140 can be positioned relative to the conductors 132 where the conductors pass through recesses 144 formed in the tensioned flexible material 118. The supports 140 can protect the conductors 132 from abrasion and/or other damage associated with repeated bending during device rotation. For instance, the supports 140 can underly the conductors 132 and partially define a bend radius surface that the conductors bend around during rotation of the first and second portions. Thus, the supports 140 can provide a technical solution for being very thin yet protecting conductors 132 passing through a very thin fabric hinge (e.g., the tensioned flexible hinge 114) during rotation of the device portions. The combined thickness of the hinge fabric 119, tongues 130, and the supports 140 is less than can be achieved with traditional hardware hinges.

Figure 2A:
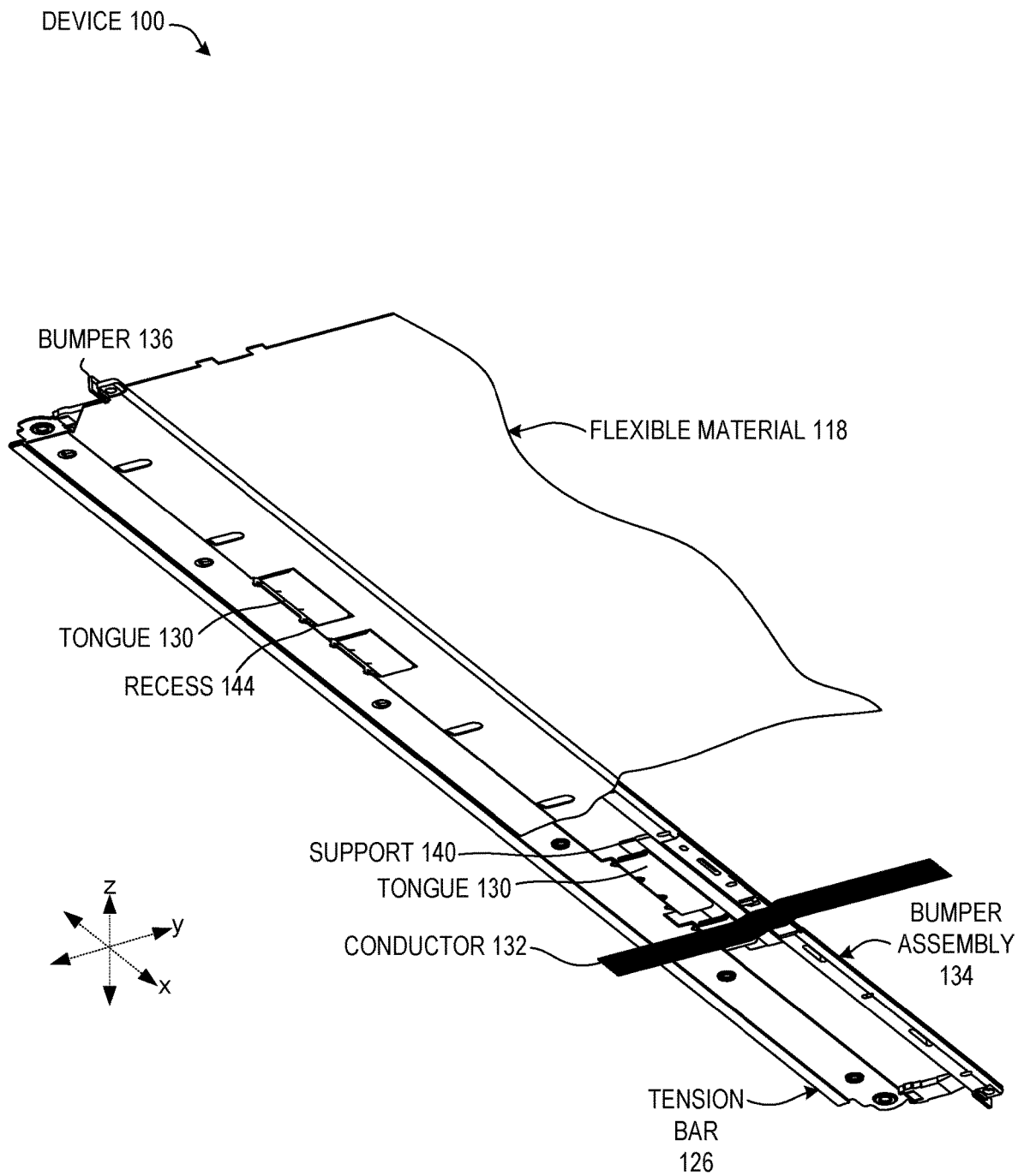
FIGS. 2A, 3B, and 4B show partial cut-away perspective views of example devices in accordance with some implementations of the present concepts.

FIGS. 2A-4D collectively show the first and second portions 102 and 104 rotated at specific orientations of the range of rotations. FIGS. 2A and 2B show the device at a fully opened orientation. In this case the fully opened orientation is 180 degrees. However, the fully opened orientation may be a different angle in other implementations. For instance, the fully opened orientation could be 360 degrees. FIGS. 3A-3C show the device in a partially opened orientation of 90 degrees. FIGS. 4A-4D show the device in the closed orientation (e.g., zero-degree orientation).

Figure 2B:
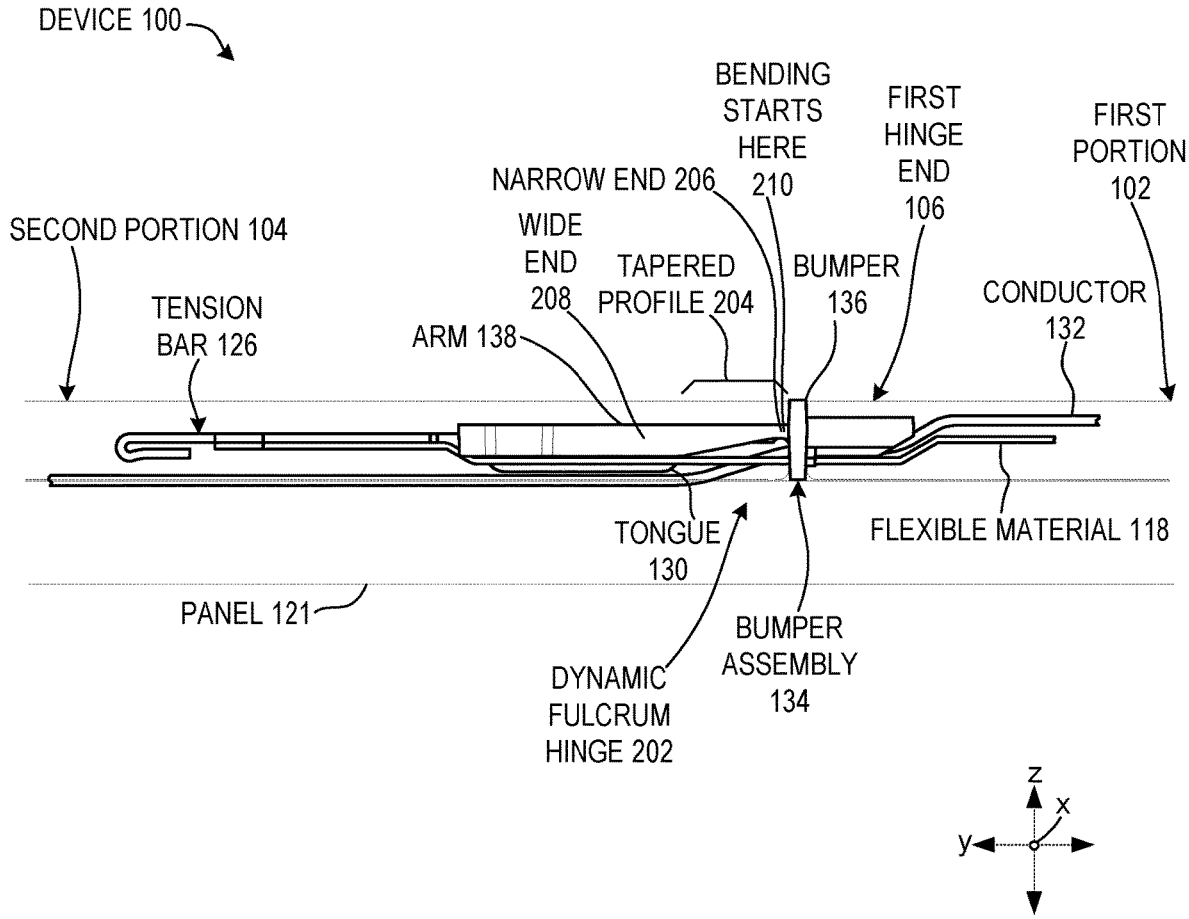
FIGS. 2B, 3C, 4C, and 4D show elevational views of example devices in accordance with some implementations of the present concepts.

FIGS. 2A and 2B show the supports 140 and the tongues 130 proximate to the conductors 132 where the conductors pass through the recesses 144 in the flexible material 118. The flexible material 118 is biased to the left by the tension bar 126 (and tension mechanisms 122 of FIG. 1A).

As mentioned above, the arms 138 can be configured to affect rotational characteristics of the tensioned flexible hinge 114. In this implementation, the arms 138 can contribute a technical solution to cause the tensioned flexible hinge 114 to operate as a dynamic fulcrum hinge 202. Toward this end, in this implementation the arms 138 can have a tapered profile 204 when viewed in the yz reference plane. The tapered profile 204 is narrower (e.g., narrow end 206) proximate to the bumper 136 (e.g., proximate to the first hinge end 106) and thicker or wider (e.g., thicker or wide end 208) proximate to the tension bar 126.

This tapered profile 204 configuration can promote bending at the narrow end 206 when counter-clockwise rotation occurs starting at the closed orientation as indicated at 210. This can be compared to FIGS. 3C and 4C. The bending can be viewed as defining the hinge axis. Thus, the hinge axis can be toward the right (e.g., toward the first portion 102) when rotation starts and progressively shifts to the left (e.g., toward the second portion 104) in the 90-degree orientation of FIG. 3C and farther to the left in the 180-degree orientation of FIG. 4C. As such, this implementation of the tensioned flexible hinge 114 is functioning as dynamic fulcrum hinge 202 in that the axis of rotation starts toward the right at the thinner or narrow end 206 as indicated at 210 and gradually moves to the left (toward the center (e.g., subsequent bending 302 (FIG. 3C) and then finally to the thicker or wide end 208 as indicated as final bending 402 (FIG. 4C)).

The dynamic fulcrum hinge 202 can provide a technical advantage of defining where stress bending forces are experienced by the conductor 132 and can limit maximum stress forces experienced by any one point on the conductor during the rotation. The dynamic fulcrum hinge 202 can also reduce occurrences of the first and second portions 102 and 104 hitting one another during rotation and potentially causing damage.

Figure 3A:
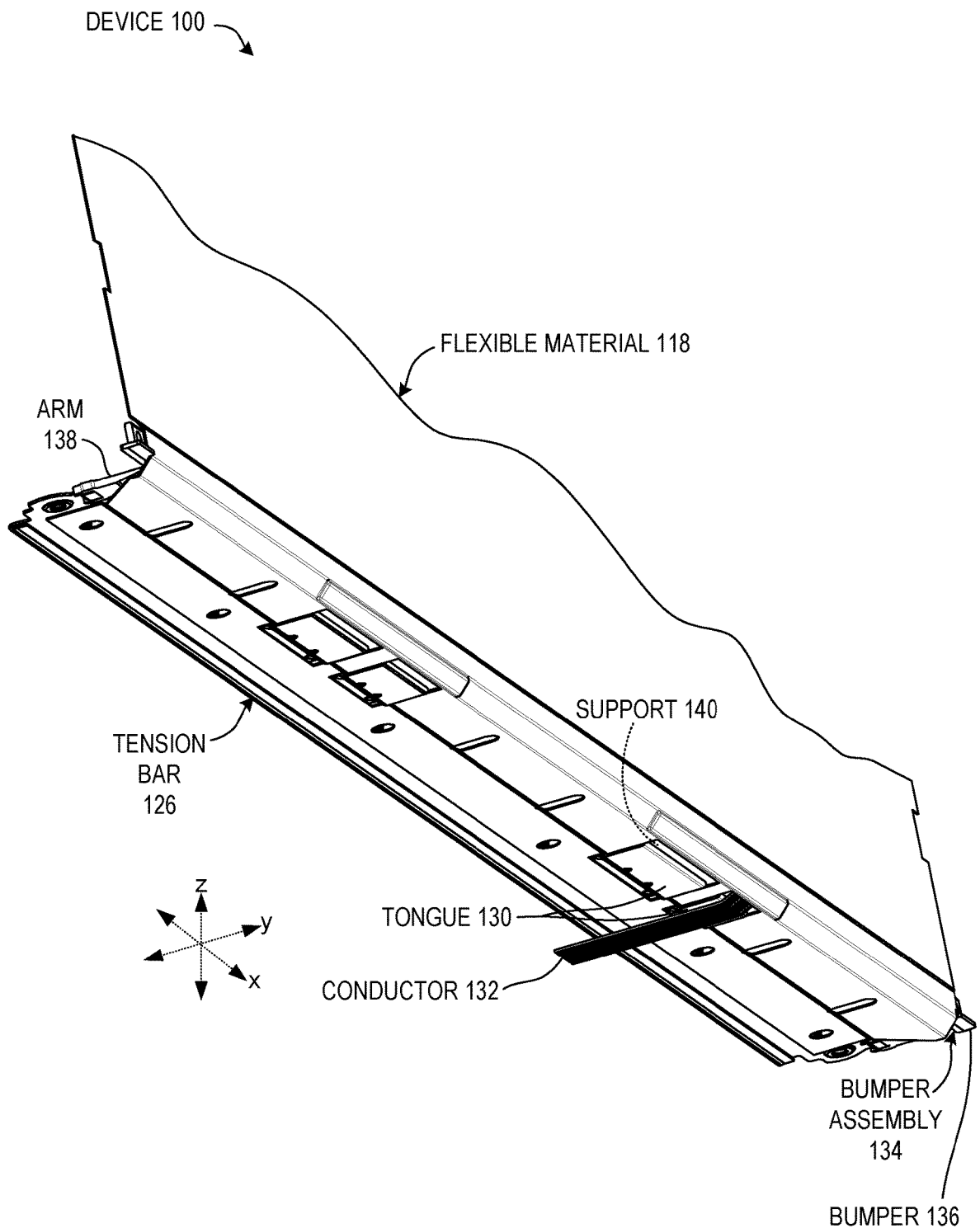
Figure 3B:
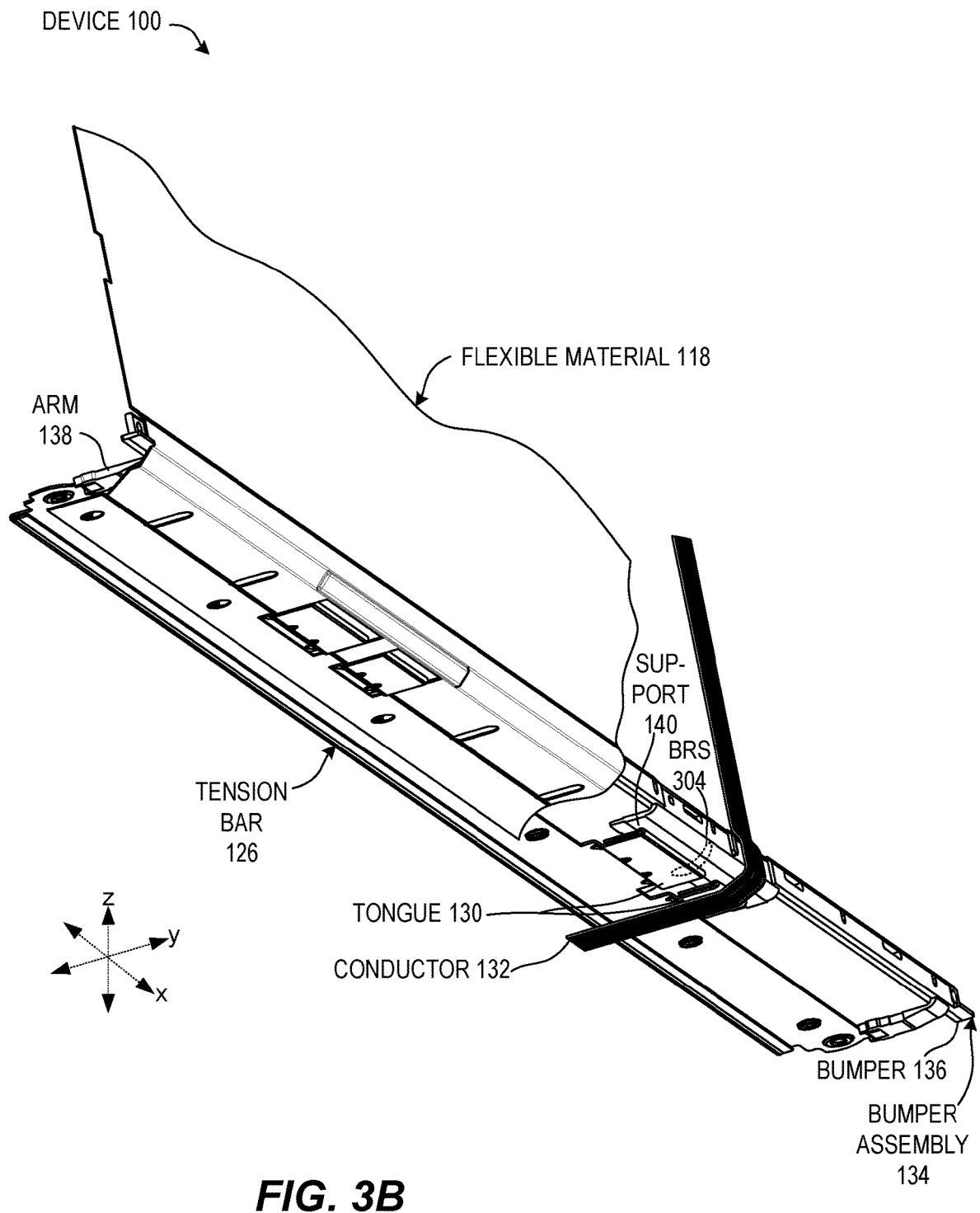
Figure 3C:
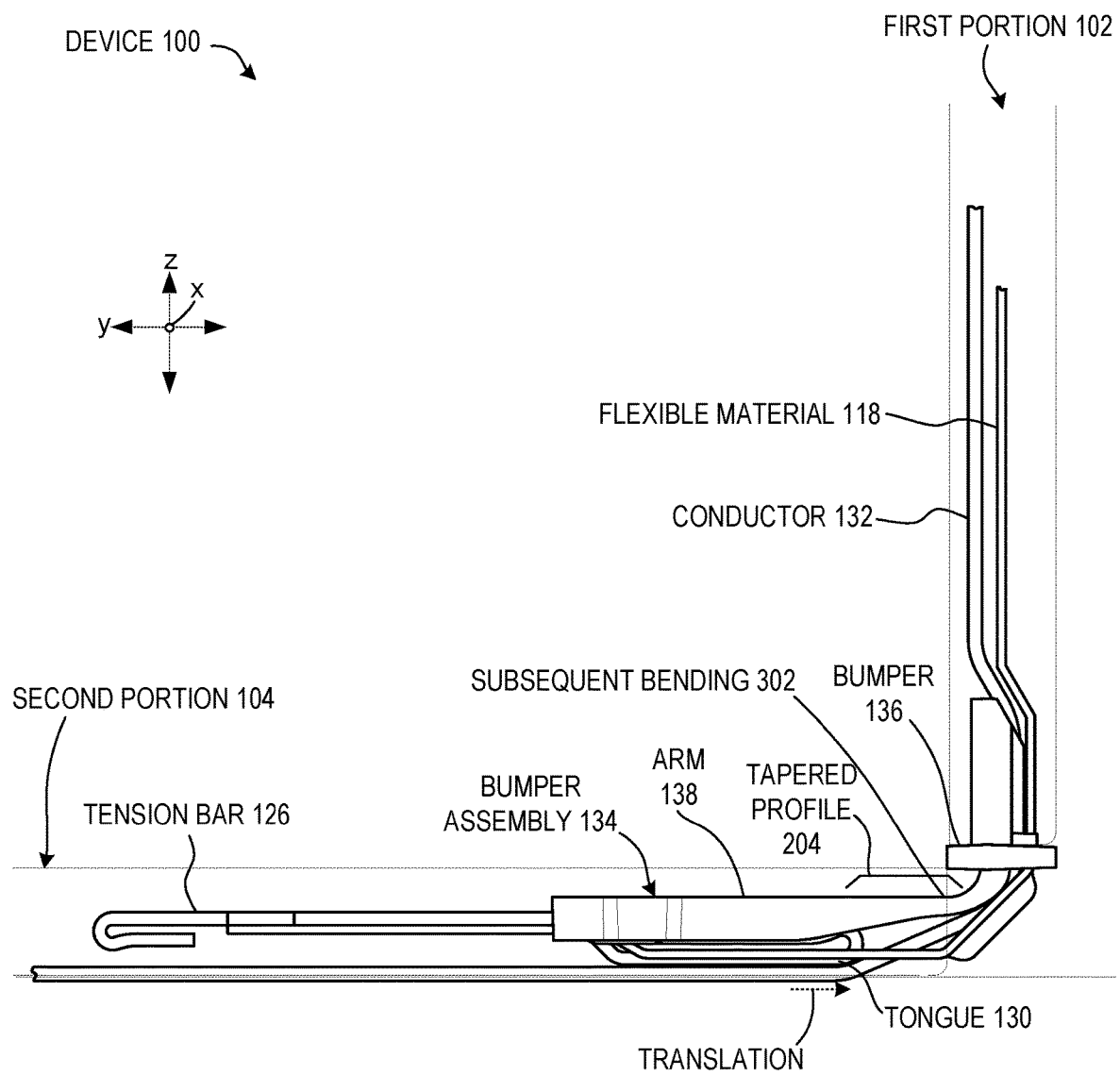
Figure 4A:
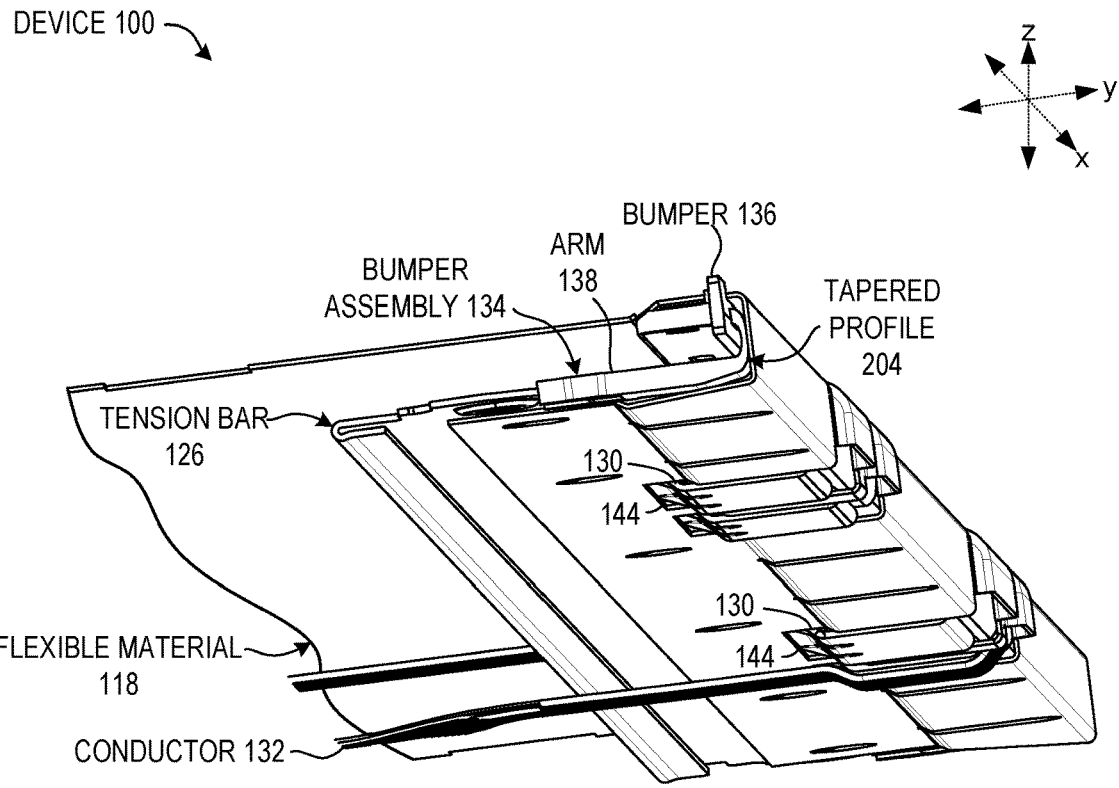
Figure 4B:
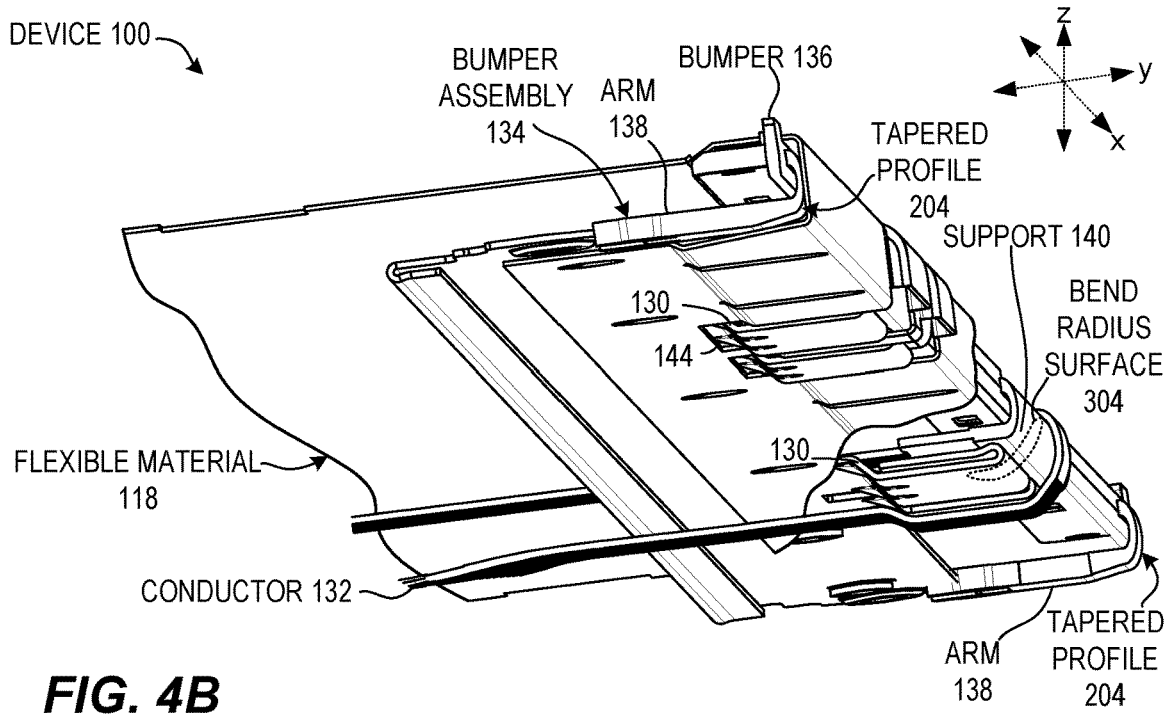
Figure 4C:
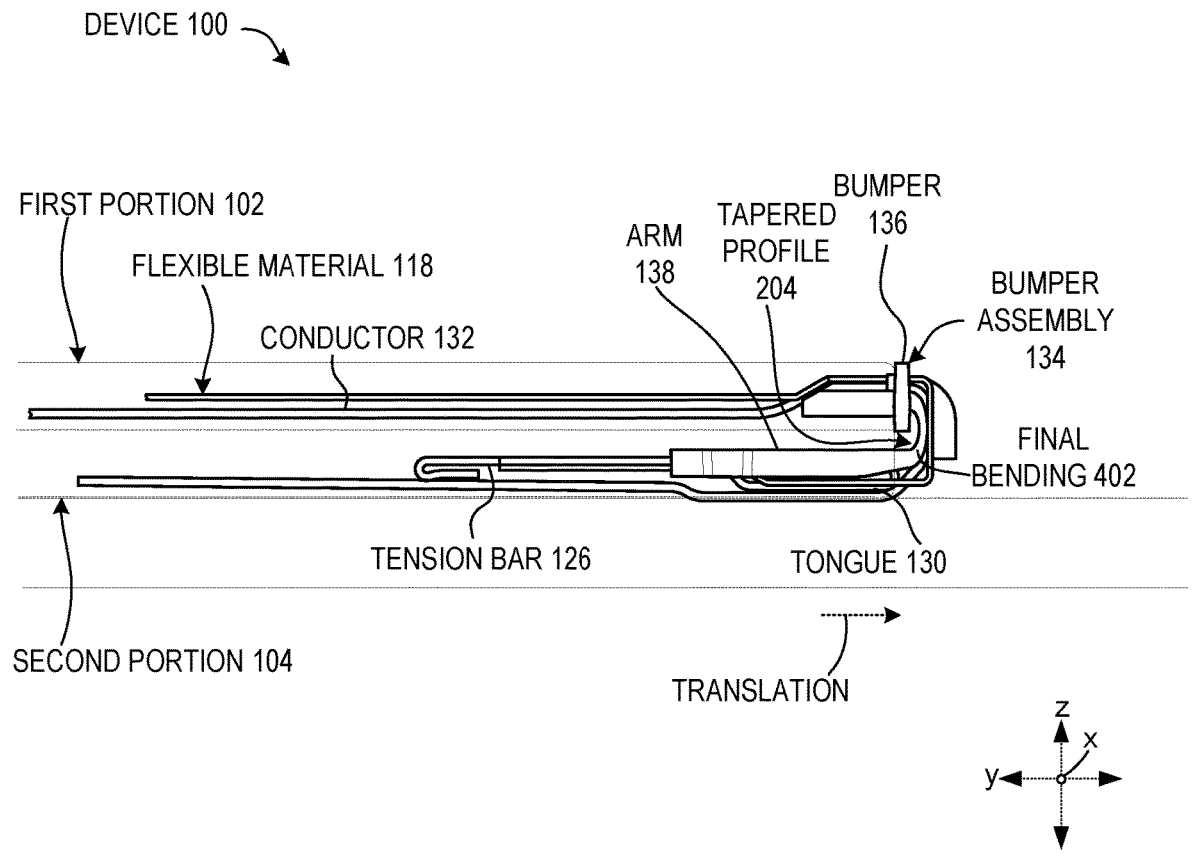
Figure 4D:
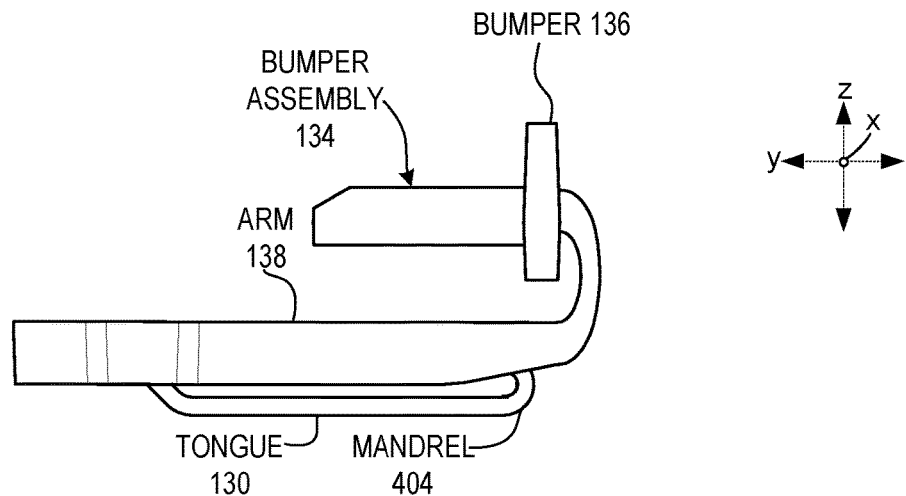

FIGS. 3A-3C show the first and second portions 102 and 104 rotated to a 90-degree orientation. Bending of the arms 138 that started at the bumper 136 has moved toward the tension bar 126. Contact of the bumper 136 on the second portion 104 is elongating a path of the flexible material 118, which creates additional tension on the flexible material. In turn, the flexible material 118 is pulling on the tension bar 126 (e.g., to the right) with sufficient force to overcome the bias of the tension mechanism 122 (FIG. 1A) and translate the tension bar 126 to the right (e.g., indicated as translation in FIG. 3C). This translation continues with continued rotation as shown in FIGS. 4C and 4D. The translation causes a mandrel or mandrel shape 404 (FIG. 4D) (e.g., the leading edge) of the tension bar 126 to move into position to at least partially define a bend radius surface (304, FIG. 3B) that the conductor experiences and bends around during rotation of the first and second portions. The bend radius surface 304 is specifically designated in FIGS. 3B and 4B. The mandrel 404 can have a shape that is low friction and does not catch on, snag, or abrade the conductor 132. In this case, the shape of the mandrel 404 is rounded.

The rounded shape of the mandrel 404 also contributes to the bend radius surface 304 generally and/or reduces any localized pinching or kinking of the conductor 132 at or proximate to the mandrel 404. Stated another way, the bend radius surface 304 defined collectively by the tongue 130 and the arm 138 provides a technical solution by defining a minimum bend radius experienced by the conductor 132 that is large enough to avoid damage to the conductor that would otherwise occur if the conductor was unprotected and bent at a smaller bend radius that damaged the conductor either initially or after multiple bending cycles.

The device components described herein can be selected from and formed using materials and techniques employed in the art. The flexible material can be selected based upon desired design properties for a given device implementation. For instance, a high fiber count woven fabric formed from high strength thread, such as Kevlar thread may be used in one implementation. High fiber count woven fabric can provide a technical solution of combining thinness with wear resistance while having desired bending properties. Another implementation may employ a polymer sheet, rather than a woven fabric, among other variations. As mentioned above, the tensioned flexible hinge can offer a technical solution for a robust hinge that meets a desired number of cycles for the lifetime of the device while being thinner and employing fewer components than traditional hardware designs. This can be accomplished while the tensioned flexible hinge protects conductors passing through the hinge and operates as a dynamic fulcrum hinge.

Although techniques, methods, devices, systems, etc., pertaining to tensioned flexible hinges are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion including a first hinge end and a first distal end, a second portion including a second hinge end and a second distal end, a tension bar positioned in the second portion and extending along the second hinge end and biased away from the second hinge end by a tensioning mechanism, a flexible material secured to the first portion and to the tension bar in the second portion to function as a hinge between the first hinge end and the second hinge end through a range of rotation of the first and second hinge ends from a closed orientation to a fully opened orientation, a bumper assembly secured between the first portion and the tension bar and interposed through a recess in the flexible material, and, a conductor extending between and electrically coupling the first and second portions, and in the closed orientation the tension bar is configured to be translated toward the second hinge end by the flexible material overcoming the bias to collectively define a bend radius surface with the bumper assembly that the conductor bends around.

Another example can include any of the above and/or below examples where the device comprises a smartphone or a notebook computer.

Another example can include any of the above and/or below examples where the flexible material comprises fabric or wherein the flexible material comprises a polymer sheet.

Another example can include any of the above and/or below examples where the tensioning mechanism comprises a pair of springs that are each stretched between the second distal end and the tension bar to create the bias on the tension bar away from the second hinge end that is transferred to the flexible material by the tension bar to create a tensioned flexible material.

Another example can include any of the above and/or below examples where the tensioned flexible material is configured to function as a tensioned flexible hinge.

Another example can include any of the above and/or below examples where the bumper assembly is secured to the first portion, and wherein the bumper assembly comprises arms that are coupled to the tension bar, and wherein the arms are configured to stabilize the first and second portions during rotation around the tensioned flexible hinge.

Another example can include any of the above and/or below examples where the bumper assembly includes a bumper that prevents the first hinge end and the second hinge end from contacting during the range of rotation.

Another example can include any of the above and/or below examples where the bend radius surface is defined in part by supports on the bumper assembly and tongues on the tension bar.

Another example can include any of the above and/or below examples where a leading edge of the tension bar that at least in part defines the bend radius surface is mandrel shaped.

Another example can include any of the above and/or below examples where the arms have a tapered profile that is relatively narrower toward the first portion and relatively wider toward the second portion.

Another example can include any of the above and/or below examples where the tapered profile is configured to at least in part cause the tensioned flexible hinge to operate as a dynamic fulcrum hinge.

Another example can include any of the above and/or below examples where starting at the closed orientation and rotating toward the fully open orientation the dynamic fulcrum hinge is configured to begin bending proximate to the first portion and progressing toward the second portion.

Another example includes a device comprising a first portion and a second portion, and, a dynamic fulcrum hinge comprising a flexible material extending between the first portion and the second portion and configured to begin rotation proximate to the first portion and finish rotation proximate to the second portion when the first portion is rotated toward the second portion.

Another example can include any of the above and/or below examples where the flexible material comprises a woven fabric.

Another example can include any of the above and/or below examples where the dynamic fulcrum hinge further comprises a bumper assembly extending through recesses in the flexible material and configured to provide a bend radius surface that defines a minimum bend radius experienced by a conductor extending through the dynamic fulcrum hinge between the first portion and the second portion.

Another example includes a device comprising a first portion and a second portion, a tensioned flexible hinge extending between the first portion and the second portion, and, a bumper assembly extending through recesses in the tensioned flexible hinge and configured to prevent the first portion from contacting the second portion during a range of rotation provided by the tensioned flexible hinge between the first portion and the second portion.

Another example can include any of the above and/or below examples where the bumper assembly is configured to contribute to bend characteristics of the tensioned flexible hinge.

Another example can include any of the above and/or below examples where the bend characteristics include defining a location of a hinge axis at various orientations.

Another example can include any of the above and/or below examples where when the first and second portions are rotated from an opened orientation toward a closed orientation, the hinge axis is initially located proximate to the first portion and moves toward the second portion.

Another example can include any of the above and/or below examples where the bend characteristics include a minimum bend radius defined by the tensioned flexible hinge.

The invention claimed is:

1. A device, comprising:
   a first portion including a first hinge end and a first distal end;
   a second portion including a second hinge end and a second distal end;
   a tension bar positioned in the second portion and extending along the second hinge end and biased away from the second hinge end by a tensioning mechanism, the tension bar defining a tongue extending toward the first portion;
   a hinge comprising a flexible material secured to the first portion and to the tension bar in the second portion to allow rotation between the first hinge end and the second hinge end through a range of rotation of the first and second hinge ends from a closed orientation to a fully opened orientation, the flexible material defining a recess through which the tongue extends;
   a bumper assembly secured between the first portion and the tension bar and supporting the tongue extending through the recess in the flexible material; and,
   a conductor extending through the recess and between and electrically coupling the first and second portions, and in the closed orientation the tension bar is configured to be translated toward the second hinge end by the flexible material overcoming the bias to collectively define a bend radius surface with the bumper assembly that the conductor bends around.

2. The device of claim 1, wherein the device comprises a smartphone or a notebook computer.

3. The device of claim 1, wherein the flexible material comprises fabric or wherein the flexible material comprises a polymer sheet.

4. The device of claim 1, wherein the tensioning mechanism comprises a pair of springs that are each stretched between the second distal end and the tension bar to create the bias on the tension bar away from the second hinge end that is transferred to the flexible material by the tension bar to create a tensioned flexible material.

5. The device of claim 4, wherein the tensioned flexible material is configured to function as a tensioned flexible hinge.

6. The device of claim 5, wherein the bumper assembly is secured to the first portion, and wherein the bumper assembly comprises arms that are coupled to the tension bar, and wherein the arms are configured to stabilize the first and second portions during rotation around the tensioned flexible hinge.

7. The device of claim 6, wherein the bumper assembly includes a bumper that prevents the first hinge end and the second hinge end from contacting during the range of rotation.

8. The device of claim 7, wherein the bend radius surface is defined in part by supports on the bumper assembly and tongues on the tension bar.

9. The device of claim 8, wherein a leading edge of the tension bar that at least in part defines the bend radius surface is mandrel shaped.

10. The device of claim 9, wherein the arms have a tapered profile that is relatively narrower toward the first portion and relatively wider toward the second portion.

11. The device of claim 10, wherein the tapered profile is configured to at least in part cause the tensioned flexible hinge to operate as a dynamic fulcrum hinge.

12. The device of claim 11, wherein starting at the closed orientation and rotating toward the fully opened orientation the dynamic fulcrum hinge is configured to begin bending proximate to the first portion and progressing toward the second portion.

13. A device, comprising:
    a first portion and a second portion; and,
    a dynamic fulcrum hinge comprising a flexible material extending between the first portion and the second portion and configured to operate cooperatively with a tapered arm that bends along a tapered profile to begin rotation proximate to the first portion and finish rotation proximate to the second portion when the first portion is rotated toward the second portion.

14. The device of claim 13, wherein the flexible material comprises a woven fabric.

15. The device of claim 13, wherein the dynamic fulcrum hinge further comprises a bumper assembly that defines the tapered arm and is configured to provide a bend radius surface that defines a minimum bend radius experienced by a conductor extending through the dynamic fulcrum hinge between the first portion and the second portion.

16. A device, comprising:
    a first portion and a second portion;
    a tensioned flexible hinge extending between the first portion and the second portion; and,
    a bumper assembly that comprises a tapered arm that creates a dynamic fulcrum of rotation for the first and second portions, the bumper assembly configured to support conductors extending through recesses in the tensioned flexible hinge and configured to prevent the first portion from contacting the second portion during a range of rotation provided by the tensioned flexible hinge between the first portion and the second portion.

17. The device of claim 16, wherein the bumper assembly is configured to contribute to bend characteristics of the tensioned flexible hinge.

18. The device of claim 17, wherein the bend characteristics include defining a location of the dynamic fulcrum that defines a hinge axis at various orientations.

19. The device of claim 18, wherein when the first and second portions are rotated from an opened orientation toward a closed orientation, the hinge axis is initially located proximate to the first portion and moves toward the second portion.

20. The device of claim 17, wherein the bend characteristics include a minimum bend radius defined by the tensioned flexible hinge.

* * * * *